United States Patent
Casper

(10) Patent No.: US 6,916,365 B1
(45) Date of Patent: Jul. 12, 2005

(54) SOLVENTBORNE AND ACTIVATED SOLVENTBORNE PAINT PACKS, AND WATERBORNE COATING COMPOSITIONS CONTAINING THEM

(75) Inventor: James William Casper, High Wycombe (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/868,805

(22) PCT Filed: Dec. 23, 1999

(86) PCT No.: PCT/GB99/04375

§ 371 (c)(1),
(2), (4) Date: Jun. 21, 2001

(87) PCT Pub. No.: WO00/39228

PCT Pub. Date: Jul. 6, 2000

(30) Foreign Application Priority Data

Dec. 24, 1998 (GB) ............................................ 98284433

(51) Int. Cl.⁷ .................................................. C09D 5/02
(52) U.S. Cl. ...................... 106/238; 106/239; 106/241; 106/287.26; 106/401; 106/311; 106/901
(58) Field of Search ............................. 427/180, 372.2, 427/384, 385.5, 401; 106/31.01, 31.96, 218, 236, 238, 239, 241, 285, 287.23, 400, 401, 311, 901

(56) References Cited

U.S. PATENT DOCUMENTS

| 3,639,147 | A | * | 2/1972 | Benefiel et al. ............. 428/216 |
| 3,959,554 | A |   | 5/1976 | Hick ........................... 428/336 |
| 4,252,796 | A | * | 2/1981 | Yu et al. ...................... 514/181 |
| 4,363,887 | A | * | 12/1982 | Leep ........................... 523/402 |
| 5,075,370 | A | * | 12/1991 | Kubitza et al. ............. 524/591 |
| 5,212,216 | A |   | 5/1993 | Hattori et al. .............. 523/415 |
| 5,391,630 | A | * | 2/1995 | Miwa et al. ................. 525/285 |
| 5,585,427 | A | * | 12/1996 | Schimmel et al. .......... 524/377 |
| 5,654,360 | A | * | 8/1997 | Palasz .......................... 524/521 |
| 5,820,925 | A | * | 10/1998 | Fenn et al. .................. 427/140 |
| 6,309,707 | B1 | * | 10/2001 | Mayer et al. ............ 427/385.5 |
| 6,627,603 | B1 | * | 9/2003 | Bibette et al. ................. 514/3 |

FOREIGN PATENT DOCUMENTS

| DE | 3546594 | 12/1987 |
| DE | 4226270 | 2/1994 |
| EP | 0 358 979 | 3/1990 |
| EP | 0 654 055 | 12/1997 |
| FR | 2301575 | 9/1976 |
| WO | WO 96/30425 | 10/1996 |
| WO | WO 99/07463 A1 * | 2/1999 |

* cited by examiner

Primary Examiner—Shrive P. Beck
Assistant Examiner—William Phillip Fletcher, III
(74) Attorney, Agent, or Firm—Donald R. Palladino; Jacques B. Miles

(57) ABSTRACT

A pigmented solventborne paint pack which can be made into a waterborne coating composition is provided, which comprises: i) a solution in an organic solvent of polymer having functional groups and hydrophilic groups; and ii) a waterborne pigment dispersion comprising pigment dispersed in water in the presence of a pigment dispersant, the aqueous pigment dispersion itself being in dispersion in the solution of i). Also provided is a solventborne activated paint pack comprising the paint pack described above and further comprising a crosslinker which is dissolved in the organic solvent. Further provided is a waterborne coating composition which comprises a dispersion in an aqueous medium of the solventborne activated paint pack.

18 Claims, No Drawings

SOLVENTBORNE AND ACTIVATED SOLVENTBORNE PAINT PACKS, AND WATERBORNE COATING COMPOSITIONS CONTAINING THEM

REFERENCE TO RELATED APPLICATIONS

This patent application claims priority of GB 9828443.3 filed on Dec. 24, 1998, which was also filed as PCT Application No. PCT/GB99/04375 on Dec. 23, 1999, designating the United States of America.

FIELD OF THE INVENTION

This invention relates to a coating composition, certain intermediate compositions in its preparation, a process for preparing the composition and to the use of the composition in a coating process.

BACKGROUND

One significant market for paints is in the repainting of motor vehicles after crash damage repair or refurbishment. This is often referred to as Vehicle Refinish. One of the most common types of vehicle refinish paints currently on the market comprises a hydroxyl functional polymer and a polyisocyanate crosslinker in an organic solvent. Because the polymer and the crosslinker react together from the time they are mixed, they are generally supplied to the end user as two separate components which are mixed together shortly before use. For this reason, they are often called "two-pack" paints.

In practice, the component containing the polymer also contains any components such as pigments, fillers, extenders or other additives which may be required to give the paint its final colour or to modify its properties. Pigments or extenders are particulate materials which are held in stable dispersion in the solventborne composition by a pigment dispersant. In making the compositions, the pigments, fillers and extenders are usually firstly made into a pigment millbase. A pigment millbase is made by mixing the pigments, fillers and extenders and the pigment dispersant, usually with a little solvent, in a high shear mixer such as a ball mill so as to thoroughly separate the pigment particles and coat them with dispersant. The resulting millbase is then mixed with polymer and solvent to form the composition known as the "paint pack" as sold to the end user. The user then mixes this paint pack with a solution of the crosslinker in organic solvent, referred to as the "hardener", just prior to use.

There is environmental and legislative pressure to reduce the emission of organic solvents from coating compositions when they are applied and dried to form a paint film. One way to achieve this is to use waterborne compositions.

Producing a waterborne equivalent of the vehicle refinish two pack paint described above is not simply a question of replacing all of the solvent with water. Each component must be modified in order to make it water soluble or dispersible. In particular, the modification would necessarily involve the introduction of hydrophilic groups into the crosslinker which must be made water dispersible. The introduction of hydrophilic groups into the crosslinker has been found to make the final paint film more sensitive to water, rendering this route unattractive in producing high performance refinish paints with good water resistance.

In an alternative (see EP-358979) the polymer is produced in an organic solvent. On completion of the polymerisation reaction the organic solvent is removed and the polymer and is made into an aqueous solution or dispersion. Pigment may then be added to the aqueous polymer solution or dispersion (if required) before addition of the isocyanate crosslinkers.

It is however desired to obtain coatings having improved water resistance compared to the water resistance of coatings produced in accordance with EP-358979. This is achieved in accordance with the present invention by the use of a solution in an organic solvent of polymer having functional group and hydrophilic groups having dispersed therein a waterborne pigment dispersion.

One proposed alternative method of producing a waterborne two pack composition uses a solventborne paint pack. The polymer and the crosslinker are both chosen to be soluble in an organic solvent and the pigment millbase is made using a pigment dispersant compatible with the solvent. The polymer is dissolved and the pigment is dispersed in the organic solvent to form the solventborne paint pack. The end user dissolves the crosslinker in the solventborne paint pack to form an activated paint pack and then disperses this in water to form the waterborne coating composition ready for use.

It has been found that this route can provide waterborne two pack compositions with equivalent performance to solventborne compositions. The problem with this route is that although the majority of the carrier fluid can be water, there is still a relatively high level of solvent present from the solventborne paint pack. Levels of solvent in essentially waterborne compositions are often expressed as volatile organic content (voc) in grams per liter of composition excluding water (g/l). For primer composition, these types of composition still have a voc in the region of 350 g/l. This is less than conventional solventborne primer compositions but existing and forthcoming regulations are aiming at 250 g/l, and a still lower level is clearly desirable. For single layer topcoat compositions these types of composition still have a voc in the region of 420 g/l, which again is less than conventional solventborne topcoat compositions but forthcoming regulations are aiming at 340 g/l, and a still lower level is clearly desirable.

We have now discovered that it is possible to reduce the voc of these types of composition by the use of a waterborne pigment millbase. This waterborne millbase is dispersed in a solution of the polymer in an organic solvent so as to form the paint pack. The polymer has hydrophilic groups so that it acts to stabilise the water-in-oil emulsion of the millbase in the polymer solution. It also has functional groups which will react with the crosslinker. A crosslinker is used which is not hydrophilically modified and which is soluble in the organic solvent. Just prior to use, the crosslinker is added to this dispersion and dissolved in the solvent and then this mixture is finally dispersed in water. This oil-in-water dispersion is also stabilised by the polymer. This method allows crosslinker without hydrophilic groups to be used, while at the same time allowing compositions to be made having a volatile organic content significantly lower than those made by conventional routes.

SUMMARY OF THE INVENTION

According to the present invention there is provided a pigmented solventborne paint pack which can be made into a waterborne coating composition which comprises;
i) a waterborne pigment dispersion, comprising pigment in dispersion in water in the presence of a pigment dispersant, the waterborne pigment dispersion itself being in dispersion in
ii) a solution in an organic solvent of polymer having functional groups and hydrophilic groups.

The present invention also provides a solventborne activated paint pack which comprises the solventborne paint pack and a crosslinker which is dissolved in the organic solvent. The present invention also provides a waterborne coating composition which comprises a dispersion in an aqueous medium of the solventborne activated paint pack.

According to the present invention there is also provided a process for producing a solventborne paint pack which can be made into a pigmented waterborne coating composition comprising a polymer having functional groups and hydrophilic groups and a crosslinker for the polymer, comprising the steps of;
i) forming a solution of the polymer in an organic solvent
ii) dispersing a waterborne pigment dispersion in the polymer solution.

The present invention also provides a process for producing a solventborne activated paint pack, which can be made into an aqueous coating composition, comprising the further step of adding to the solventborne paint pack a crosslinker which is soluble in the organic solvent and forming a solution of the crosslinker in the solvent.

The present invention also provides a process for producing an aqueous coating composition which comprises the further step of emulsifying the solventborne activated paint pack in an aqueous medium.

DETAILED DESCRIPTION OF THE INVENTION

Organic solvents include any non-aqueous solvents which can be used to dissolve the polymer and which have little or no solubility in water. It can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these.

The polymer can be any polymer having functional groups and hydrophilic groups and which can act to stabilise the dispersion of aqueous millbase in the polymer solution and which can stabilise the emulsion of activated paint pack in the aqueous phase.

Functional groups are groups which can react with a crosslinker so as to crosslink the polymer in the final coating film. For example, the functional groups can be amine groups, hydroxyl groups, acetoacetate groups, silane groups, carboxylic acid groups or epoxy groups, preferably hydroxyl groups or epoxy groups and most preferably hydroxyl groups.

Examples of suitable hydrophilic groups are carboxylic acid groups and amine groups. When the hydrophilic groups are carboxylic acid groups, the polymer preferably has an acid value of 20 to 250. When the hydrophilic groups are amine groups, the polymer preferably has an amine value of 20 to 250. Preferably acid or amine groups on the polymer are at least partially neutralised and more preferably fully neutralised. For example, acid groups can be neutralised using a suitable base such as ammonia or an amine such as dimethylethanolamine, and amine groups can be neutralised using an acid such as lactic acid or acetic acid. When the hydrophilic groups are amine groups or carboxylic acid groups, they can also act as functional groups.

The polymer can be a vinyl addition polymer, a polyester, a polyurethane, a mixed polyester-polyurethane or an epoxy polymer, preferably a vinyl addition polymer, a polyester, a polyurethane or a mixed polyester-polyurethane and most preferably a vinyl addition polymer.

Preferred polymers have a number average molecular weight as measured by gel permeation chromatography of 700 to 10,000, more preferably 1,000 to 4,000. Preferably, when the polymer has hydroxyl groups, it has a hydroxyl value of 5 to 500, more preferably 50 to 250.

Preferred polymers have an acid value (AV) of up to 50. Acid value is the mass of potassium hydroxide in milligrams required to neutralize the acid groups in 1 gram of solid resin.

Suitable polyesters are derived from a polybasic acid and a polyhydroxy compound and are generally hydroxyl functional.

Polybasic acids are compounds having two or more carboxylic acid groups. Such polybasic acids are well known in the polyester art. Examples of suitable polybasic acids are $C_{1-6}$ alkane dioic acids such as succinic acid, glutaric acid, adipic acid or hexanedioic acid, cycloaliphatic acids such as hexahydrophthalic acid, unsaturated alkane dioic acids such as fumaric or maleic acids, dimer acids, and aromatic acids such a phthalic acid, isophthalic acid and trimellitic acid. Ester-forming derivatives of such acids can also be used in place of the free acids. Ester-forming derivatives include anhydrides and lower alkyl, for example methyl or ethyl, esters. Mixtures of two or more acids or their ester-forming derivatives can be used.

Polyhydroxy compounds are compounds having two or more hydroxyl groups and are well known in the polyester art. Examples of suitable polyhydroxy compounds are diols such as ethylene glycol, propylene glycol, 1,3-propane diol, butylene glycol, 1,4-butane diol, 1,6-hexane diol, neopentyl glycol, triols such as trimethylol propane, and glycerol, tetrols such as pentaerythritol and higher polyols such as sorbitol. Mixtures of two or more of these polyols can be used.

Polyurethanes or mixed polyester-polyurethanes can be made in a similar way to polyesters but using a di- or polyisocyanate instead of some or all of the polybasic acid. They are generally hydroxyl functional. Suitable diisocyanates are tetramethylxylene diisocyanate, hexamethylene diisocyanate, isophorone diisocyanate and toluene diisocyanate. Suitable polyisocyanates include the isocyanurate trimers, allopanates and uretdiones of diisocyanates such as those described above as well as the reaction products of these diisocyanates with polyols. Polyols are compounds having two or more hydroxyl groups. Suitable polyols include trimethylol propane, glycerol and pentaerythritol. Many such polyisocyanates are commercially available, for example under the Desmodur trade mark from Bayer or the Tolonate trade mark from Rhodia.

The polyester, polyurethane or polyester-polyurethane can be made by conventional means. Generally the components of the polyester are melted together or dissolved in a suitable solvent, such as xylene. The melt or solution is then heated so as to remove the water produced in the reaction between the acid and the hydroxyl groups. When the components are melted together, the water can conveniently be removed using a fractionating column at temperatures of between 150 and 250° C. When the components are dissolved in a solvent the water can conveniently be removed by azeotropic distillation using a Dean and Stark apparatus at the reflux temperature of the solvent. A combination of these method can be used, initially melting the components together and removing water using a fractionating column and then adding solvent and removing further water using a Dean & Stark apparatus. If a polyisocyanate is to be included to produce a polyester-polyurethane, then this is generally added after reaction of the other components, and at a lower temperature, such as between 50 and 100° C. because the isocyanate groups are much more reactive than acid or ester groups.

Acrylic addition polymers are derived from polymerisable ethylenically unsaturated monomers such as vinyl or acrylic monomers and comprise functional units, hydrophilic units and structural units. Whenever referred to herein, the term acrylic monomer refers to esters of acrylic or methacrylic acid. The term (meth) acrylate refers to both the acrylate and methacrylate equally and the term (meth) acrylic acid refers to acrylic or methacrylic acid equally.

Functional units are derived from vinyl or acrylic monomers which have functional groups on them. For example, glycidyl methacrylate can be used to produce a polymer having epoxy functional groups and aminoethyl methacrylate can be used to produce a polymer having amine functional groups. Polymers having hydroxyl functional groups can be made using hydroxyl functional vinyl or acrylic monomers. An example of a hydroxyl functional vinyl monomer is vinyl alcohol. Examples of hydroxyl functional acrylic monomers are hydroxy ethyl (meth) acrylate, hydroxy butyl (meth) acrylate and hydroxy propyl (meth) acrylate.

Other examples of suitable hydroxyl functional monomers are the reaction products of glycidyl (meth) acrylate with mono-carboxylic acids, such as versatic acid and the reaction product of (meth) acrylic acid with monoepoxy compounds such as Cardura E™ (the glycidyl ester of versatic acid; from Shell).

Hydrophilic units are derived from monomers having hydrophilic groups. Examples of monomers having hydrophilic groups are acid functional monomers, such as acrylic acid and methacrylic acid, and amine functional monomers such as dimethylaminoethyl acrylate.

Structural units are derived from monomers which do not have any functional groups which will react with the crosslinker nor any hydrophilic groups. Examples monomers from which the structural units can be derived are non-functional vinyl monomers and alkyl esters of (meth) acrylic acid.

Examples of suitable non-functional vinyl monomers are styrene, tertiary butyl styrene and alphamethyl styrene, preferably alphamethyl styrene. Examples of suitable alkyl esters of (meth) acrylic acid are $C_{1-12}$ alkyl esters such as methyl (meth) acrylate, ethyl (meth) acrylate, n-butyl (meth) acrylate, t-butyl (meth) acrylate, n-propyl (meth) acrylate and isobornyl (meth)acrylate.

Molecular weight regulators such as mercapto compounds, for example n-ctyl mercaptan, can also be added to control molecular weight.

Preferred acrylic addition polymers have a theoretical glass transition temperature (Fox Tg) of –30 to 80° C., more preferably –10 to 50° C.

Many suitable acrylic addition polymers are commercially available. They can also be produced by conventional means. The acrylic addition polymer can be produced by contacting a mixture of the appropriate monomers with a polymerisation initiator at a temperature at which polymerisation occurs. For example the monomer mixture can be slowly fed into a solution of initiator held at the polymerisation temperature or the initiator can be fed into a solvent at the polymerisation temperature simultaneously with the monomer mixture.

Suitable initiators are azo initiators such as azodiisobutyronitrile and 2,2' azobis (2-methylbutyronitrile) or peroxy initiators such as benzoyl peroxide.

The pigment is dispersed in water using a suitable pigment dispersant. A suitable pigment dispersant is Dispex GA40™.

The term pigment includes fillers and extenders as well as conventional pigments. Pigments are particulate materials which impart colour or opacity to the final paint film. Extenders and fillers are usually inorganic materials which can be used to reduce the cost of a formulation or to modify its properties. In particular, fillers and extenders can be used in primers to improve their ability to hide minor surface imperfections and also to make them easier to rub down with sandpaper to provide a smooth surface for subsequent topcoat application. We have found that the process of the present invention is particularly beneficial in the production of primers because they contain a relatively high level of pigment and so the reduction in voc achieved by this process is particularly marked. Crosslinkers are compounds which react with at least two functional groups on the polymer so as to crosslink the composition. When the functional groups are carboxylic acid groups an example of a suitable crosslinker is a carbodiimide. When the functional groups are amine groups, examples of suitable crosslinkers are polyepoxides and polyisocyanates. When the functional groups are epoxy groups, examples of suitable crosslinkers are polyamines. When the functional groups on the polymer are hydroxyl groups, examples of suitable crosslinkers are phenol formaldehydes, melamine formaldehydes and polyisocyanates.

Polyisocyanates are preferred crosslinkers. Polyisocyanates are compounds having two or more isocyanate groups per molecule and are well known in the coatings art. The isocyanate groups can be blocked but unblocked isocyanates are preferred.

Suitable diisocyanates are tetramethylxylene diisocyanate, hexamethylene diisocyanate, toluene diisocyanate and isophorone diisocyanate. Preferably, the polyisocyanate has an isocyanate functionality of 2.5 or more isocyanate groups per molecule. Suitable polyisocyanates of this kind include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerythritol. Many such polyisocyanates are commercially available, for example under the Desmodur trade mark from Bayer or the Tolonate trade mark from Rhodia.

The aqueous medium comprises at least 50% by weight water, preferably at least 90% and most preferably substantially all, for example 99.5%, water. The other components of the aqueous medium can be water miscible organic solvents.

The compositions can also contain catalysts for the reaction between the functional groups on the polymer and the crosslinker. For example, suitable catalysts for the isocyanate-hydroxyl reaction include tin catalysts such as dibutyl tin dilaurate and amine catalysts such as triethylamine. The compositions can also contain other conventional paint additives such as, pigments, fillers, UV absorbers and flow aids.

The solution of polymer can be made either by making the polymer in organic solvent or by simple stirring of the polymer with the organic solvent.

The pigment millbase can be made by mixing the pigments, fillers and extenders and the pigment dispersant, optionally with some water in a high shear mixer such as a ball mill, or a high speed rotary disperser so as to thoroughly separate the pigment particles and coat them with dispersant.

The crosslinker can be dissolved in the organic solvent by mixing, for example by stirring.

The solventborne mixture of polymer, crosslinker and dispersed waterborne millbase can be dispersed in the aqueous medium by stirring.

The coating composition of the invention can be applied to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The coating composition can be applied by conventional means such as by brush, roller or spray, preferably spray. The substrate can be for example, metal, plastic, wood or glass. The compositions are particularly useful for refinishing motor vehicles when they can be used as topcoats although they are especially useful as primers.

The applied layer can be allowed to cure at ambient temperature in the case where the polymer and crosslinker react together at ambient temperatures. Alternatively the layer can be baked at elevated temperatures, for example 5°–120° C. to accelerate curing. Drying and curing typically takes between 5 minutes and 24 hours depending on the ambient conditions and on the particular components used. Conveniently it takes about 15 minutes to about 5 hours.

According to the present invention there is also provided a coated article obtainable by the process.

The invention will now be illustrated by means of the following examples in which all parts are by weight.

EXAMPLES

1. Waterborne Pigment Millbase.

A dispersant (Dispex GA40™, 2.991 parts), antifoaming agent (Synperionic DF210™, 0.300 parts) and water (11.762 parts) were mixed together and put into a high speed disperser. The disperser was turned on and zinc oxide (2.054 parts), zinc phosphate (14.266 parts), talc (24.414 parts), calcium carbonate (16.270 parts), titanium dioxide (Tipure R960-09™, 21.563 parts) and Organic Black dispersion (Sandosperse™, 0.498 parts were added steadily so as to avoid the formation of lumps. Water (5.882) was added with the pigment to maintain a fluid mixture. High speed stirring was continued for 45 to 60 minutes. Mixing was continued for a further 5 minutes.

Hydroxyl Functional Acrylic Polymer

A mixture of alpha methyl styrene (6.65 parts), tertiary butyl acrylate (19.96 parts), hydroxybutyl acrylate (19.16 parts), butyl acrylate (11.99 parts), acrylic acid (2.14 parts), azidiisobutyronitrile (Vazo 67™, 2.57 parts), n-octyl mercaptan (2.33 parts) and butyl acetate 7.18 parts) were slowly added to a mixture of butyl acetate (21.14 parts and alpha methyl styrene (6.65 parts) over 180 minutes at a temperature of 135° C. The mixture was held at 135° C. for 15 minutes and then further initiator (Triganox 21S™, 0.115 parts) was added. The mixture was stirred for a further 60 minutes and then further initiator (Triganox 21S™, 0.115 parts) was added. The mixture was held at 135° C. for a further 60 minutes before being allowed to cool. The hydroxyl functional polymer had an acid value of 28.

3. Pigmented Paint Pack

A mixture of dimethylaminoethanol (0.57 parts) and water (5.16 parts) was added to the polymer solution produced in 2 above (15.77 parts). This mixture was added to the pigment millbase prepared in 1 above (73.87 parts) with stirring followed by butyl acetate (4.57 parts), and dibutyl tin dilaurate catalyst (0.06 parts).

4. Primer Compositions.

Three primer compositions according to the invention were made with three different polyisocyanate hardeners. The components are set out in Table 1 below;

| Composition | Polyisocyanate Hardener | Pigmented Paint Pack | Hardener | Water |
|---|---|---|---|---|
| 1 | Tolonate HDT90 | 50 | 3.05 | 5 |
| 2 | Desmodur Z4470 | 50 | 5.15 | 7.1 |
| 3 | Cythane 3174 | 50 | 5.8 | 7 |

5. Comparative Tests

Two primer compositions were made, composition 4 according to the invention and comparative composition 5 using hydrophilically modified polyisocyanates which was added to the aqueous composition after mixing of the millbase and water. These compositions used the pigmented paint pack from 3 above (300 parts). For composition 4, a non-hydrophilically modified polyisocyanate, Cythane 3174™ (34.8 parts) was added to the paint pack with stirring and then water (43.8 parts) was added with stirring to give the final paint composition 4. For comparative composition 5, water (43.8 parts) was added to the paint pack and then a hydrophilically modified polyisocyanate Desmodur VPLS 2032™ (39.6 parts) was added with stirring.

These primer compositions were applied by spray to steel panels to give a dry film thickness of 80 microns in three coats. The panels were left for 24 hours at ambient temperature (about 20° C.) to dry and cure.

The dried primer coatings were sanded to a smooth finish with P300 paper and a mechanical sander, and then topcoated with a commercial black two-pack polyurethane topcoat. This was allowed to dry at ambient temperature for 1 hour and then stoved for 30 minutes at 60° C.

The primed and topcoated panels were tested for Konig hardness and Watersoak Resistance. Watersoak Resistance is measured according to SMMT (Society of Motor Manufacturers Test) number 57. The results were as follows;

|  | Appearance | SMMT Watersoak | Adhesion |
|---|---|---|---|
| Primer 4 | Smooth & Glossy | 8M | 33 |
| Comparative Primer 5 | Glossy with Pinholes | 8VD | 1 |

The Watersoak Resistance test result indicates the blistering of the paint after 3 days. M means Medium blisters and VD means Very Dense blisters. The blister size of 8 is on a scale of 1 to 10 where 1 is 10 nm and 10 is microscopic. Adhesion indicates the percentage of coating remaining intact after applying sticky tape to the tested topcoat and removing it.

This Watersoak Resistance test very clearly shows the benefit of the process and composition according to the invention which avoids the need for hydrophilically modified polyisocyanates while giving a much lower voc than is achievable by using known solventborne millbases in conjunction with non-hydrophilically modified polyisocyanates.

6. Topcoat Composition.

A white topcoat according to the invention was prepared as follows.

White Waterborne Pigment Millbase.

A dispersant (Dispex GA40™, 26.5 parts), antifoaming agent (Synperionic DF210™, 9 parts), polypropylene glycol (100.0 parts) and water (150.0 parts) were mixed together and put into a high speed disperser. The disperser was turned on and titanium dioxide (Tipure R960-09™, 1393.0 parts) was added steadily so as to avoid the formation of lumps. Water (183.0 parts) was added with the pigment to maintain a fluid mixture. High speed stirring was continued for 45 to 60 minutes. Mixing was continued for a further 5 minutes.

White Pigmented Paint Pack

A 10% aqueous solution of dimethylaminoethanol (7 parts) was added to the polymer solution produced in 2 above (200.00 parts). This mixture was added to the white pigment prepared above (190.0 parts) with stirring followed by butyl acetate (20 parts), and dibutyl tin dilaurate catalyst (0.25 parts).

White Topcoat Composition.

A white topcoat was made by mixing the paint pack prepared as above (164 parts), a polyisocyanate (Cythane 3174™, 46.0 parts), a 10% aqueous solution of dimethylaminoethanol (14.0 parts) and water (200.0 parts).

Application and Testing

The paint was allowed to stand for 30 minutes after mixing to give a low viscosity composition suitable for spraying. The composition was sprayed onto a primed steel panel at a 40 micometer dry film thickness. It was left to dry for 1 hour at ambient temperature (about 20° C.) and then stoved for 30 minutes at 60° C.

The resulting topcoat was smooth, glossy and defect free with a gloss of 70 at 20 degree angle and a Koenig hardness of 53.

What is claimed is:

1. A coating composition comprising:
   (a) a pigmented solventborne paint pack comprising a water-in-oil emulsion comprising:
      i) a solution in an organic solvent of a polymer having functional groups and hydrophilic groups; and
      ii) a waterborne pigment dispersion comprising pigment dispersed in water in the presence of a pigment dispersant, the aqueous pigment dispersion itself being in dispersion in said solution i), and
   (b) an aqueous phase,
   wherein the pigmented solventborne paint pack is dispersed in the aqueous phase.

2. The coating composition of claim 1 in which the functional groups are hydroxyl groups.

3. The coating composition of claim 2 in which the polymer has a hydroxyl value of 5 to 500.

4. The coatina composition of claim 3 in which the polymer has a hydroxyl value of 50 to 250.

5. The coating composition of claim 1 in which the hydrophilic groups are carboxylic acid groups or amine groups.

6. The coating composition of claim 5 in which the hydrophilic groups are carboxylic acid groups and the polymer has an acid value of 20 to 250.

7. The coating composition of claim 5 in which the hydrophilic groups are amine groups and the polymer has an amine value of 20 to 250.

8. The coating composition of claim 1 in which the polymer is a vinyl addition polymer, a polyester, a polyurethane, a mixed polyester-polyurethane or an epoxy polymer.

9. The coating composition of claim 8 in which the polymer is a vinyl addition polymer, a polyester, a polyurethane or a mixed polyester-polyurethane.

10. The coating composition of claim 9 in which the polymer is a vinyl addition polymer.

11. The coating composition of claim 10 in which the polymer has a theoretical glass transition temperature (Fox $T_g$) of −30 to 80° C.

12. The coating composition of claim 11 in which the polymer has a theoretical glass transition temperature (Fox $T_g$) of −10 to 50° C.

13. The coating composition of claim 1 in which the polymer has a number average molecular weight as measured by gel permeation chromatography of 700 to 10,000.

14. The coating composition of claim 13 in which the polymer has a number average molecular weight of 1,000 to 4,000.

15. The coating composition of claim 1 in which the polymer has an acid value of up to 50.

16. A coatina composition comprising:
   (a) a pigmented solventborne activated paint pack comprising a water-in-oil emulsion comprising:
      i) a solution in an organic solvent of a polymer having functional groups and hydrophilic groups;
      ii) a waterborne pigment dispersion comprising pigment dispersed in water in the presence of a pigment dispersant, the aqueous pigment dispersion itself being in dispersion in said solution i); and
      iii) a crosslinker which is dissolved in the organic solvent; and
   (b) an aqueous phase;
   wherein the pigmented solventborne activated paint pack is dispersed in the aqueous phase.

17. The coating composition of claim 16 in which the crosslinker is a phenol formaldehyde, melamine formaldehyde, or polyisocyanate.

18. The coating composition of claim 17 in which the crosslinker is a polyisocyanate.

* * * * *